United States Patent
Simons

(10) Patent No.: US 10,373,407 B2
(45) Date of Patent: Aug. 6, 2019

(54) ACCESS AUTHORIZATION SYSTEM COMPRISING AT LEAST ONE ARRANGEMENT OF A PLURALITY OF MICROPARTICLES AND AT LEAST ONE IDENTIFICATION UNIT

(71) Applicant: 3S SIMONS SECURITY SYSTEMS GMBH, Nottuln (DE)

(72) Inventor: Rolf Simons, Nottuln (DE)

(73) Assignee: 3S SIMONS SECURITY SYSTEMS GMBH, Nottuln (DE)

(*) Notice: Subject to any disclaimer, the term of this patent is extended or adjusted under 35 U.S.C. 154(b) by 0 days.

(21) Appl. No.: 15/570,009

(22) PCT Filed: Apr. 27, 2016

(86) PCT No.: PCT/EP2016/000669
§ 371 (c)(1),
(2) Date: Oct. 27, 2017

(87) PCT Pub. No.: WO2016/173709
PCT Pub. Date: Nov. 3, 2016

(65) Prior Publication Data
US 2018/0158264 A1 Jun. 7, 2018

(30) Foreign Application Priority Data
Apr. 29, 2015 (EP) .................. 15001267

(51) Int. Cl.
*G07C 9/00* (2006.01)
*G06K 19/06* (2006.01)
(Continued)

(52) U.S. Cl.
CPC .......... *G07C 9/00007* (2013.01); *B42D 25/23* (2014.10); *B42D 25/30* (2014.10); *G06K 19/06018* (2013.01); *G06K 19/06178* (2013.01)

(58) Field of Classification Search
CPC .......... G07C 9/00007; G06K 19/06178; B42D 25/30; B42D 25/351; B42D 25/36
(Continued)

(56) References Cited

U.S. PATENT DOCUMENTS 5,673,338 A 9/1997 Denenberg et al.
6,309,690 B1 * 10/2001 Brogger ................ A63B 45/02
427/256
(Continued)

FOREIGN PATENT DOCUMENTS

DE 2651158 5/1977
DE 19853764 5/2000
(Continued)

OTHER PUBLICATIONS

International Search Report, dated Jun. 7, 2016, priority document.

*Primary Examiner* — Paultep Savusdiphol
(74) *Attorney, Agent, or Firm* — Greer, Burns & Crain, Ltd.

(57) ABSTRACT

An access authorization system comprising at least one arrangement of a plurality of microparticles and at least one identification unit. The arrangement of the microparticles is affixed to the identification unit. The arrangement of the microparticles forms a forgery-proof identification. A microparticle used in the arrangement has at least one first layer and at least one second layer.

14 Claims, 2 Drawing Sheets

(51) Int. Cl.
  *B42D 25/23* (2014.01)
  *B42D 25/30* (2014.01)

(58) Field of Classification Search
  USPC .................................................. 235/375, 382
  See application file for complete search history.

(56) References Cited

U.S. PATENT DOCUMENTS

| | | | |
|---|---|---|---|
| 6,455,157 B1 | 9/2002 | Simons | |
| 6,584,214 B1* | 6/2003 | Pappu | G06K 9/00 340/5.86 |
| 7,380,128 B2* | 5/2008 | Bourrieres | G06K 9/00577 713/182 |
| 7,647,279 B2* | 1/2010 | Bourrieres | G06Q 20/3674 705/64 |
| 7,726,708 B2* | 6/2010 | Bourrieres | E05B 39/00 292/307 B |
| 8,256,688 B2* | 9/2012 | Bourrieres | G07F 7/125 235/454 |
| 8,576,070 B2* | 11/2013 | Bourrieres | G06K 19/073 340/539.26 |
| 2001/0041214 A1* | 11/2001 | Brogger | A63B 45/02 427/8 |
| 2003/0014647 A1* | 1/2003 | Bourrieres | G06K 9/00577 713/185 |
| 2005/0075984 A1* | 4/2005 | Bourrieres | G06Q 20/3674 705/64 |
| 2005/0242194 A1* | 11/2005 | Jones | C09J 9/00 235/487 |
| 2008/0034426 A1 | 2/2008 | Stierman et al. | |
| 2008/0142671 A1* | 6/2008 | Bourrieres | G06K 19/073 248/551 |
| 2008/0217931 A1* | 9/2008 | Bourrieres | E05B 39/00 292/307 A |
| 2009/0218401 A1* | 9/2009 | Moran | G06K 5/00 235/439 |
| 2009/0309733 A1* | 12/2009 | Moran | G06K 19/041 340/572.1 |
| 2011/0042454 A1* | 2/2011 | Jones | B41M 3/14 235/375 |
| 2012/0061461 A1* | 3/2012 | Bourrieres | G07F 7/125 235/375 |
| 2015/0140334 A1 | 5/2015 | Simons | |

FOREIGN PATENT DOCUMENTS

| | | |
|---|---|---|
| EP | 1335327 | 8/2003 |
| EP | 2688011 | 1/2014 |
| WO | 2007106512 | 9/2007 |

\* cited by examiner

ACCESS AUTHORIZATION SYSTEM COMPRISING AT LEAST ONE ARRANGEMENT OF A PLURALITY OF MICROPARTICLES AND AT LEAST ONE IDENTIFICATION UNIT

CROSS-REFERENCES TO RELATED APPLICATIONS

This application claims the benefit of the European patent application No. 15001267.2 filed on Apr. 29, 2015, the entire disclosures of which are incorporated herein by way of reference.

BACKGROUND OF THE INVENTION

The present invention relates to an access authorization system comprising at least one arrangement of a plurality of microparticles. In addition to simple mechanical access controls, such as for example keys, combined mechanical and electronic access controls or wholly electronic access controls are also realized in conjunction with access authorization systems, in particular computer systems or computer networks but also access controls for buildings.

In this context, queries are made of, for example, access cards or passwords.

However, having proven problematic for electronic access controls is the fact that experts can circumvent such access controls, whereby these experts take advantage of vulnerabilities in the electronic access controls and "hack into" them.

There is thus the need to make access authorization systems even more secure, in particular to the effect of preventing or obstructing unauthorized persons from gaining access to protected systems by means of access authorization.

Color-coded microparticles consisting of a plurality of colored layers in a preselected color sequence, wherein the color sequence represents an identification code, are already known from DE 26 51 158 A1. The microparticles are thereby made of melamine-alkyd resin, whereby, for example, 7 layers of color are deposited one atop the other at a thickness of approximately 100 μm on a polyester carrier film of approximately 50 μm.

DE 198 53 764 A1 relates to a system for securing and marking products using microparticles which each have a respective plurality of color layers forming a code.

SUMMARY OF THE INVENTION

It is thus the task of the present invention to advantageously further develop an access authorization system of the type cited at the outset, in particular to the effect of the access authorization system only granting access to properly identified persons and those who are also actually entitled to have access authorization.

This task is solved in accordance with the invention by an access authorization system comprising at least one arrangement of a plurality of micro-particles and at least one identification unit, wherein the arrangement of microparticles is affixed to the identification unit, wherein the arrangement of microparticles forms a forgery-proof identification and wherein a respective microparticle comprises at least one first layer and at least one second layer.

The invention is based on the basic concept of a forgery-proof identification unit as a component part of an access authorization system in order to supplement an additional security feature. Here, a common identification unit, for example a code card or a so-called badge having, for example, an electronic identifier or digital identifier stored on a magnetic strip or an RFID chip able to be read by the access authorization system and serving for identification purposes, is thereby supplemented by a physical forgery-proof identification so that the access authorization is not solely based on the electronic code and/or the code digitally stored on the identification unit. Instead, a further identification which is neither electronic nor digital now comes into play and in the absence of it being correctly identified, identification with respect to the access authorization system is not possible.

The arrangement of the microparticles can exist exactly once. Due to the fact that a plurality of microparticles are used which are manufactured in a manufacturing process (see, e.g., WO 97/38409 A1 or EP 2 688 011 A1, incorporated herein by reference) for producing microparticles which are in each case already unique in their own right by virtue of the manufacturing process, an arrangement of microparticles is, by definition, obtained which only exists exactly once. The access authorization system can thus be modified such that exactly one arrangement of microparticles can, in each case, be assigned to different users.

It can furthermore be provided for a plurality of arrangements, each of clearly different configuration from one another, to be provided. Moreover, coming into play as a further security feature can be that in addition to the configuration of the individual microparticles, the arrangement of the individual microparticles relative to each other can also be randomized and thereby be able to be of clearly different configuration from one another. Forgery security can thereby be increased even further.

Each individual identification unit can be associated with exactly one arrangement of microparticles. This thereby enables each individual identification unit, such as, e.g., an access card or a badge, to also be provided with, in addition to for example a unique code, a unique forgery-proof identification comprising a plurality of microparticles, and the identification unit then being associated with the respective person who is also entitled to access authorization.

The access authorization system can further comprise a reader unit, by means of which the identification unit can be analyzed. For example, the forgery-proof identification formed by the arrangement of the plurality of microparticles can be analyzed by means of the reader unit. The access authorization system can analyze by means of the reader unit whether the identification unit presented for access authorization verification is, in fact, an actual valid identification unit serving as identification of access authorization.

The reader unit can comprise an optical analytics module, by means of which the arrangement of the microparticles can be recorded and analyzed. It is, for example, conceivable for the reader unit to comprise optical sensors such as, for example, a camera, by means of which the arrangement of the microparticles can be recorded and then analyzed, for example, by means of image processing procedures executed by the analytics module or an image analysis module of the optical analytics module. This thereby enables easily and reliably checking the validity of the microparticle arrangement forming a forgery-proof identification.

The reader unit can further comprise a data storage or be able to be connected to a data storage of the access authorization system, whereby the data storage stores information on the arrangement of the microparticles. It is, for example, conceivable for information to be stored in the data storage on the type and extent of the access authorization. Moreover, the forgery-proof identifications and/or arrangements of microparticles which exist and are also actually used in conjunction with the access authorization system can also be stored in the data storage (although not only just there). It is also conceivable to store information on which identification unit (e.g. having which electronic and/or digital code) is associated with which microparticle arrangement.

The access authorization system can further comprise at least one processing unit, wherein the access authorization system can be structured such that access is only permitted to the processing unit upon the reader unit correctly identifying the identification unit. The processing unit can be a simple personal computer (PC) or even also a computer network or a large data processing system or server system or communication network or the like.

The processing unit can, in particular, be a computer system such as, for example, a PC, laptop, tablet PC or the like.

It can moreover be provided for the processing unit to be a component part of a physical access control unit such as an access control to a building. It is, for example, conceivable for the identification unit and the access authorization system to be identification means serving in conjunction with controlling access authorization of individuals to company buildings or public buildings, e.g., the seat of public institutions, offices or governmental administrations and the like.

The present invention furthermore relates to the use of an access authorization system as described above in identifying access authorization.

The present invention furthermore relates to a method for verifying an access authorization using an access authorization system as described above.

BRIEF DESCRIPTION OF THE DRAWINGS

Further details and advantages of the invention are now to be described in greater detail on the basis of an example embodiment as depicted in the figure.

DETAILED DESCRIPTION OF THE PREFERRED EMBODIMENTS

Figure 1:
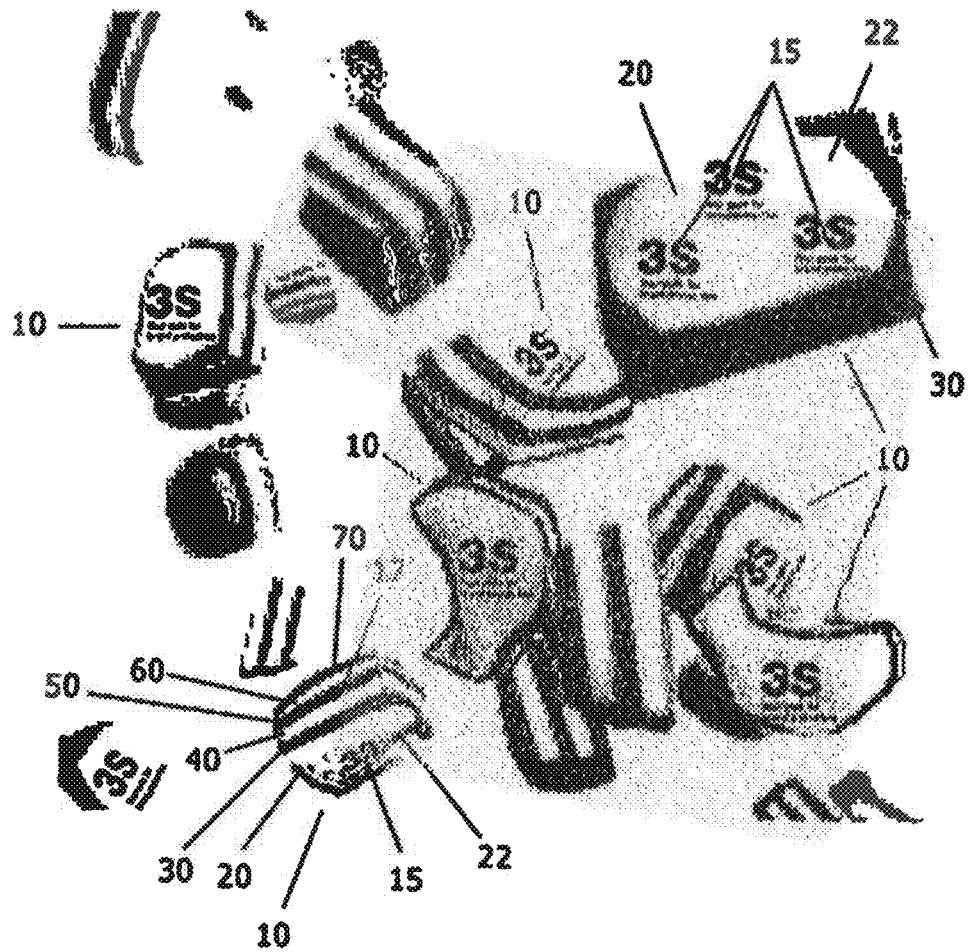
FIG. 1 shows a plurality of microparticles in accordance with the inventive system, the inventive use of a system as well as an inventive method according to one example embodiment of the invention.

FIG. 1 shows a plurality of microparticles 10 as a component of the inventive system 1.

The microparticles 10 thereby exhibit at least one first layer 20 on which the further layers 30, 40, 50, 60, 70 can be deposited in the manufacturing process. The first layer 20 is thus a substrate layer 20.

Layers 30, 40, 50, 60, 70 are thereby colored layers deposited on the substrate layer 20.

The first layer 20, or substrate layer 20 respectively, forms an external side 22 of the microparticle 10. At least one symbol 15, here a logo 15 and/or the trademark of a company 15, is thereby disposed on the external side 22. The symbol 15 is thereby already applied to and/or deposited on the layer 20 in advance.

However, it is, in principle, also conceivable for the first layer 20, or substrate layer 20 respectively, to be a colored layer onto which no symbol 15 is applied.

In particular, layer 20 can be a carrier film, in particular a plastic film such as a polyester film/PET film. Generally suitable are plastic films which remain dimensionally and shape stable (even when heated). The symbol 15 can thereby be imprinted or applied in some other way onto the carrier film 20. It is, in principle, also conceivable for the symbol 15 to be deposited on the carrier film 20 as nanoscale lettering. For example, it is conceivable for the font size or the character height to amount to 1 nm or more.

It is further conceivable for the carrier film 20 to comprise a plurality of symbols 15 in the form of holograms or imprints on side 22.

The microparticles 10 are thereby structured such that none of the dimensions of the microparticles 10 exceed approximately 200-300 µm, particularly 100 µm, preferably 50-60 µm, particularly preferentially 8 µm. In the example embodiment depicted in the figure, the selected dimensions of the microparticles 10 are in the range of between approximately 8 µm to approximately 100 µm, wherein, however, this lower limit and upper limit are not undershot and/or exceeded.

The layers 30, 40, 50, 60, 70 are colored layers, in the present case, for instance, a red colored layer 30, a white colored layer 40, a blue colored layer 50, another white colored layer 60 and a black colored layer 70.

A microparticle 10 further comprises at least one surface 17 which is structured such that the stacked colored layers 30, 40, 50, 60, 70 are discernible. The surface 17 is a side surface 17 ensuing from the grinding process during the manufacturing of the microparticle 10, for example essentially a cut edge or a breaking edge.

The arrangement of the colors and/or colored layers 30, 40, 50, 60, 70 forms a color code which, in combination with symbol 15, here, for example, a company trademark, forms as a whole, a forgery-proof code. This code can be easily verified, for example by means of a pocket microscope or reflected light microscope respectively.

It is, in principle, also conceivable for the microparticles 10 to be dispersed in a coating such as, for example, a paint or a lacquer, and thus able to be applied directly onto the product to be marked.

The microparticles 10 can be produced for example pursuant to EP 2 688 011 A1 or DE 26 51 158 A1, incorporated herein by reference.

The colored layers can form a color code as per DE 198 53 764 A1, incorporated herein by reference.

The size of the microparticles 10 is thereby advantageously selected within a range of between approximately 8 µm to approximately 100 µm since this range ensures that at least one symbol 15 is, in any case, discernible on the external side 22 of the substrate layer 20.

As FIG. 1 reveals, due to the grinding process, the microparticles 10 are not identical but rather randomized in form; i.e., the particle shapes are random and not predefined.

Figure 2:
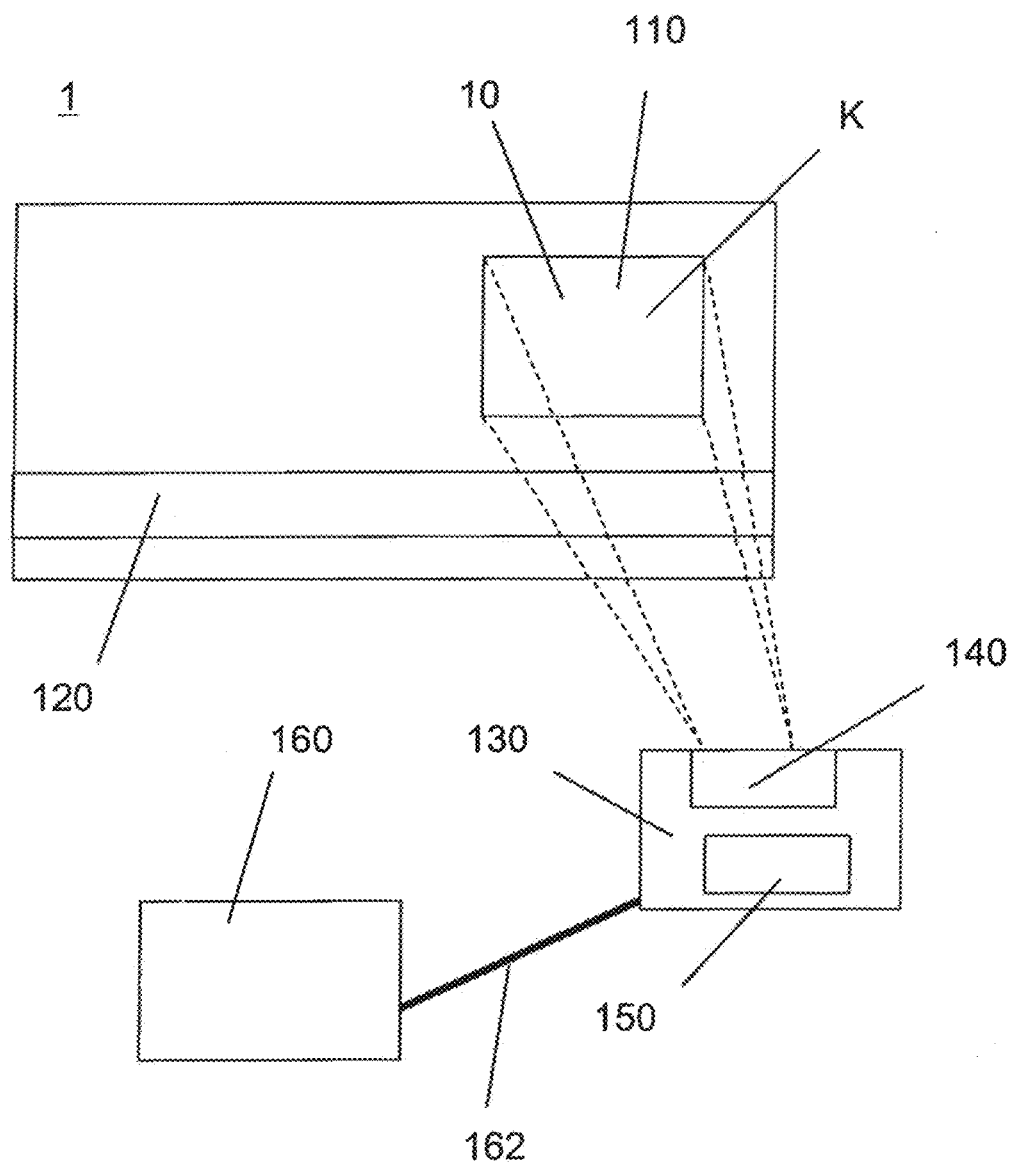
FIG. 2 shows a schematic depiction of the inventive system, the inventive use of the system as well as a method according to the invention.

FIG. 2 schematically shows the configuration of the access authorization system 1 according to an example embodiment of the present invention.

As is apparent from FIG. 2, the access authorization system 1 comprises an arrangement 110 of a plurality of microparticles 10 and an identification unit 120 in the form of an access card.

A magnetic strip and/or a RFID code is, for example, incorporated into the identification unit 120, by means of which a digital signature can be linked to, or respectively disposed on, the identification unit 120.

The arrangement 110 of the microparticles 10 is likewise disposed on the identification unit 120. Thus, in addition to the digital signature, a further physical signature is also concurrently disposed on the identification unit 120.

The microparticles 10 form a forgery-proof identification K. The arrangement 110 of the microparticles 10 thereby exists exactly once.

A plurality of arrangements 110 thereby also form arrangements which are in each case of clearly different form from one another.

The fact that the arrangement 110 of the microparticles 10 exists exactly once and that a plurality of arrangements 110 are in each case formed differently from one another is related to individualized microparticles being in each case produced in the manufacturing process of the microparticles 10, as described for example in EP 2 688 011 A1 or DE 26 51 158 A1, due to the grinding and thus the producing of the individual microparticles from the base layers deposited on each other forming a plate-like layer structure. Constructing an arrangement 110 from a plurality of these microparticles 10 moreover further results in an arrangement which is, in its own right, able to be clearly differentiated from another arrangement 110.

Because such an arrangement 110 can, for example, be produced by a plurality of microparticles being applied to the identification unit 120 in a lacquer or, for example, a transparent adhesive by a dispenser (not shown in any greater detail), whereby the positioning of the microparticles within the arrangement 110 is randomized.

Thus, produced in each case per arrangement is an arrangement 110 which inevitably differs from another respective arrangement 110.

Each identification unit 120 is associated with exactly one arrangement 110 of microparticles 10.

Moreover, the access authorization system 1 comprises a reader unit 130, by means of which the identification unit 20 can be analyzed.

The reader unit 130 thereby comprises an optical analytics module 140, by means of which the arrangement 110 of the microparticles 10 can be recorded and analyzed.

The reader unit 130 furthermore comprises a data storage 150 or can be connected to a data storage 150 of the access authorization system 1.

Information on the arrangement 110 of the microparticles 10 is stored in the data storage 150.

The access authorization system 1 further comprises at least one processing unit 160, whereby the access authorization system 1 is structured such that access is only permitted to the processing unit 160 upon the reader unit 130 correctly identifying the identification unit 120.

To that end, the processing unit 160 is connected to the reader unit 130, e.g., wirelessly or also by cable if need be (see FIG. 2 of connecting cable 162).

The processing unit 160 can be a computer system such as, for example, a single computer, a tablet PC, a laptop or even a computer network or a server infrastructure. It is however also conceivable for the processing unit 160 to be the component part of a physical access control unit such as an access control to a building.

The method for access authorization control by means of the access authorization system 1 ensues as follows:

Utilizing the access authorization system 1 as described above, the identification unit 120 is inserted into the reader unit 130 or brought into the proximity of the reader unit 130 respectively such that the reader unit 130 can analyze both the electronic/digital code affixed to the identification unit 120 as well as the forgery-proof identification K comprising the arrangement 110 of the plurality of microparticles 10.

The digital code of the identification unit 120 is read by reading out e.g. a magnetic strip or RFID chip which is affixed to the identification unit 120 and is also already commonly known.

The forgery-proof identification K is analyzed by means of the optical analytics module 140 which, for example, records the arrangement 110 of the microparticles 10 with a camera and compares the generated image file to the information on existing forgery-proof identifications K stored in the data storage 150.

Should the access authorization system 1 find that the forgery-proof identification K exists and that the forgery-proof identification K is moreover also linked to the electronic/digital code associated with the identification unit 120, the access authorization system 1 thus identifies that there is access authorization.

Otherwise, no access is granted.

Also conceivable in this context is also being able to use the access authorization system in conjunction with events, for example as admission tickets.

Depending on the configuration of the access authorization system, in particular arrangement 110 as well as identification unit 120, it is also conceivable for access to be permitted to different areas within one building. For example, in conjunction with events, these areas can thereby be for example different areas of the event venue; e.g., respective reserved seating and/or standing room sections, box seat sections and/or VIP areas sections, etc.

In conjunction with access authorization systems for buildings, it is however also conceivable for each forgery-proof identification to be associated with an access authorization to a specific area or section of the building, in particular one, several and/or all of the building floors, depending on the access authorization of the individual user.

Each forgery-proof identification can also contain user-specific properties such as, e.g., company affiliation (e.g., by using the corporate colors in the color code as generated). It is also conceivable for the forgery-proof identification K to include country-specific information, e.g., national colors being assigned to a forgery-proof identification, whereby, for example, the respective colors also appear in the forgery-proof identification.

Due to the fact that, as noted above, an arrangement 110 of microparticles 10 exists exactly once, upon loss of an identification unit 120 having a corresponding arrangement 110 comprising a plurality of microparticles 10, it suffices when the lost identification unit 120 is replaced by a new identification unit 120 having a new arrangement 110. It is not necessary to regenerate the color code formed by the color layers of the microparticles 10. Only the newly generated arrangement 110 of the microparticles 10 ensures the accurate identification of the newly issued identification unit 120.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An access authorization system comprising:
at least one arrangement of a plurality of microparticles, the particular arrangement of microparticles existing exactly once, and at least one identification unit,
wherein the microparticles are randomized in shape and have a size such that none of the dimensions of the microparticles exceed approximately 200 micrometers,
wherein the arrangement of microparticles is affixed to the identification unit,
wherein the arrangement of microparticles forms a forgery-proof identification, and
wherein a microparticle comprises at least one first colored layer and at least one second and differently colored layer.

2. The access authorization system according to claim 1, wherein a plurality of arrangements are provided which are each of a different configuration from one another.

3. The access authorization system according to claim 2, wherein each identification unit is associated with exactly one arrangement of microparticles.

4. The access authorization system according to claim 1, wherein the access authorization system further comprises a reader unit by means of which the identification unit can be analyzed.

5. The access authorization system according to claim 4, wherein the reader unit comprises an optical analytics module, by means of which the arrangement of the microparticles can be recorded and analyzed.

6. The access authorization system according to claim 4, wherein the reader unit further comprises a data storage or is configured to be connected to a data storage of the access authorization system, wherein information on the arrangement of the microparticles is stored in said data storage.

7. The access authorization system according to claim 4, wherein the reader unit further comprises at least one processing unit, wherein the access authorization system is structured such that access is only permitted to the processing unit upon the reader unit correctly identifying the identification unit.

8. The access authorization system according to claim 7, wherein the processing unit is a computer system.

9. The access authorization system according to claim 7, wherein the processing unit is a component part of a physical access control unit.

10. The access authorization system according to claim 9, wherein the physical access control unit comprises an access control to a building.

11. The access authorization system according to claim 1, wherein the microparticles are sized such that none of the dimensions of the microparticles exceed 100 micrometers.

12. The access authorization system according to claim 1, wherein the microparticles are sized such that none of the dimensions of the microparticles exceed 60 micrometers.

13. An access authorization system comprising:
at least one arrangement of a plurality of microparticles, the particular arrangement of microparticles existing exactly once, and
at least one identification unit,
wherein the microparticles are randomized in shape and have a size such that none of the dimensions of the microparticles exceed 50 micrometers,
wherein the arrangement of microparticles is affixed to the identification unit,
wherein the arrangement of microparticles forms a forgery-proof identification, and
wherein a microparticle comprises at least one first colored layer and at least one second and differently colored layer.

14. The access authorization system according to claim 13 wherein the microparticles have a size such that the dimensions of the microparticles are in the range of 8 to 50 micrometers.

* * * * *